United States Patent
Huff et al.

(10) Patent No.: US 8,623,263 B2
(45) Date of Patent: Jan. 7, 2014

(54) PROCESS FOR CURING A POROUS MUFFLER PREFORM

(75) Inventors: Norman T. Huff, Brighton, MI (US); Janakikodandaram Karra, Nori, MI (US)

(73) Assignee: OCV Intellectual Capital, LLC, Toledo, OH (US)

( * ) Notice: Subject to any disclaimer, the term of this patent is extended or adjusted under 35 U.S.C. 154(b) by 691 days.

(21) Appl. No.: 12/563,486

(22) Filed: Sep. 21, 2009

(65) Prior Publication Data

US 2011/0031654 A1 Feb. 10, 2011

Related U.S. Application Data

(63) Continuation-in-part of application No. 12/535,936, filed on Aug. 5, 2009, now abandoned.

(51) Int. Cl.
*B29B 17/00* (2006.01)

(52) U.S. Cl.
USPC ........... 264/347; 264/494; 264/495; 264/496; 264/413; 264/414; 264/416; 264/425; 264/454; 264/459; 264/45.1; 264/50; 264/51; 264/640; 264/641; 264/642; 264/643; 264/241; 264/247; 264/255; 264/257; 264/258; 264/259; 264/260; 264/265; 264/271.1; 264/272.13; 264/272.15; 264/272.2; 264/272.21; 264/273; 264/274; 264/275; 264/279; 264/279.1

(58) Field of Classification Search
USPC ........ 264/413, 425, 37.15, 48, 916, 459, 460, 264/494, 496, 45.1, 45.3, 45.4, 36.18, 640, 264/641, 336, 674, 675, 676, 677, 604, 264/297.5, 495, 414, 416, 454, 50, 51, 642, 264/643, 241, 247, 255, 257, 258, 259, 260, 264/265, 271.1, 272.13, 272.15, 272.2, 264/272.21, 273, 274, 275, 279, 279.1

See application file for complete search history.

(56) References Cited

U.S. PATENT DOCUMENTS 3,328,086 A 6/1967 Johnston
3,334,383 A 8/1967 Irvine
(Continued)

FOREIGN PATENT DOCUMENTS

EP 692616 9/1998
EP 941441 8/2001
(Continued)

OTHER PUBLICATIONS

International Search Report and Written Opinion from PCT/US10/49484 dated Dec. 20, 2010.
(Continued)

*Primary Examiner* — Jeffrey Wollschlager
*Assistant Examiner* — Stella Yi
(74) *Attorney, Agent, or Firm* — Calfee, Halter & Griswold LLP

(57) ABSTRACT

A process for curing a porous muffler preform defined by a plurality of glass fibers and a heat-curing thermoset or thermoplastic materials applied to the plurality of glass fibers is disclosed herein. The process includes the step of enclosing the muffler preform in a chamber. The process also includes the step of surrounding the muffler preform with steam. The process also includes the step of causing steam to enter the muffler preform from multiple directions.

25 Claims, 2 Drawing Sheets

(56) References Cited

U.S. PATENT DOCUMENTS

| | | | |
|---|---|---|---|
| 3,368,239 A | 2/1968 | Wiltshire | |
| 3,616,144 A | 10/1971 | Kenney | |
| 4,069,286 A | 1/1978 | Greenhalgh | |
| 4,085,881 A | 4/1978 | Roberson | |
| 4,115,498 A | 9/1978 | Kissell et al. | |
| 4,162,877 A | 7/1979 | Nyberg | |
| 4,379,101 A | 4/1983 | Smith | |
| 4,385,955 A * | 5/1983 | Doerfling et al. | 156/245 |
| 4,469,655 A | 9/1984 | Kiss | |
| 4,569,471 A | 2/1986 | Ingemansson et al. | |
| 4,609,519 A | 9/1986 | Pichard et al. | |
| 4,663,225 A | 5/1987 | Farley et al. | |
| 4,692,291 A | 9/1987 | Angell, Jr. | |
| 4,774,985 A | 10/1988 | Broadbelt et al. | |
| 4,850,849 A | 7/1989 | Hsu | |
| 4,913,872 A | 4/1990 | Kiss | |
| 4,988,469 A | 1/1991 | Reavely et al. | |
| 5,078,938 A | 1/1992 | Munk et al. | |
| 5,108,691 A | 4/1992 | Elliott | |
| 5,158,012 A | 10/1992 | Gawlitta et al. | |
| 5,234,523 A | 8/1993 | Battreall | |
| 5,283,026 A | 2/1994 | Okumura et al. | |
| 5,503,920 A | 4/1996 | Alkire et al. | |
| 5,679,296 A | 10/1997 | Kelman et al. | |
| 5,766,541 A | 6/1998 | Knutsson et al. | |
| 5,820,801 A | 10/1998 | Greve | |
| 5,976,453 A | 11/1999 | Nilsson et al. | |
| 6,033,607 A | 3/2000 | Kataoka et al. | |
| 6,036,896 A | 3/2000 | Gupte | |
| 6,103,180 A | 8/2000 | Haeseker et al. | |
| 6,148,519 A | 11/2000 | Stenersen et al. | |
| 6,231,792 B1 | 5/2001 | Overbeek et al. | |
| 6,317,959 B1 | 11/2001 | Nilsson et al. | |
| 6,319,444 B1 | 11/2001 | Kirk | |
| 6,370,747 B1 | 4/2002 | Lewin et al. | |
| 6,412,596 B1 | 7/2002 | Brandt et al. | |
| 6,446,750 B1 | 9/2002 | Lewin | |
| 6,540,495 B2 | 4/2003 | Dahl et al. | |
| 6,543,576 B1 | 4/2003 | Cofer et al. | |
| 6,581,723 B2 | 6/2003 | Brandt et al. | |
| 6,607,052 B2 | 8/2003 | Brandt et al. | |
| 6,713,012 B2 | 3/2004 | Galloway et al. | |
| 2001/0011780 A1 | 8/2001 | Knutsson | |
| 2005/0001012 A1 | 1/2005 | Brandt et al. | |
| 2008/0145630 A1 | 6/2008 | Rockwell | |
| 2008/0290547 A1 | 11/2008 | Kashikar et al. | |
| 2008/0292739 A1 | 11/2008 | Kashikar et al. | |
| 2011/0031660 A1 | 2/2011 | Huff | |

FOREIGN PATENT DOCUMENTS

| | | |
|---|---|---|
| EP | 1810597 | 7/2007 |
| WO | 2011/017390 | 2/2011 |
| WO | 2011/035237 | 3/2011 |

OTHER PUBLICATIONS

International Search Report from PCT/US10/44335 dated Nov. 5, 2010.

Office action from U.S. Appl. No. 12/525,936 dated Jun. 22, 2011.

* cited by examiner

PROCESS FOR CURING A POROUS MUFFLER PREFORM

CROSS-REFERENCE TO RELATED APPLICATIONS

This application is a continuation-in-part application of application Ser. No. 12/535,936 for a METHOD OF FORMING A MUFFLER PREFORM, filed on Aug. 5, 2009, which is hereby incorporated by reference in its entirety.

TECHNICAL FIELD

This invention relates generally to a method and apparatus for making a preform for insertion in the cavity of a muffler.

BACKGROUND OF THE INVENTION

The exhaust system of an automobile incorporates a muffler for reducing exhaust noise from the engine. Mufflers must provide appropriate silencing while not causing too high a pressure drop. Fiber inserts can be positioned within the muffler to assist in sound dampening and minimizing pressure drop.

SUMMARY OF THE INVENTION

According to this invention there is provided a process for curing a porous muffler preform defined by a plurality of glass fibers and heat-curing thermoset or thermoplastic materials (i.e. binders) applied to the plurality of glass fibers. The function of the binder is to impart mechanical integrity to the preform so that it can be easily inserted into a muffler. The process includes the step of enclosing the muffler preform in a chamber. The process also includes the step of surrounding the muffler preform with steam. The process also includes the step of causing steam to enter the muffler preform from multiple directions.

A second process for curing a porous muffler preform defined by a plurality of glass fibers and a heat-curing thermoset or thermoplastic materials applied to the plurality of glass fibers is also provided. The second process includes the step of enclosing the muffler preform in a chamber at a first pressure. The second process also includes the step of injecting steam into the chamber through an inlet port after the enclosing step. The steam is directed by baffling surfaces inside the chamber so as to not directly impinge the steam on the muffler preform. The second process also includes the step of causing steam to enter the muffler preform from multiple directions.

A third process for curing a porous muffler preform defined by a plurality of glass fibers and a heat-curing thermoset or thermoplastic materials applied to the plurality of glass fibers is also provided. The third process includes the step of enclosing the muffler preform at a first temperature in a chamber at first pressure. The third process also includes the step of surrounding the muffler preform after the enclosing step with steam at a second pressure greater than atmosphere and the first pressure and at second temperature substantially at the boiling point of water (i.e. saturated steam) based on the second pressure. The third process also includes the step of causing steam to enter the muffler preform wherein water is condensed on the muffler preform thereby imparting heat to the binder material. The third process also includes the step of venting the chamber to the atmosphere after the condensing step such that much of the condensate on the muffler preform evaporates.

Various advantages of this invention will become apparent to those skilled in the art from the following detailed description of the preferred embodiment, when read in light of the accompanying drawings.

DETAILED DESCRIPTION OF EXEMPLARY EMBODIMENTS

Figure 1:
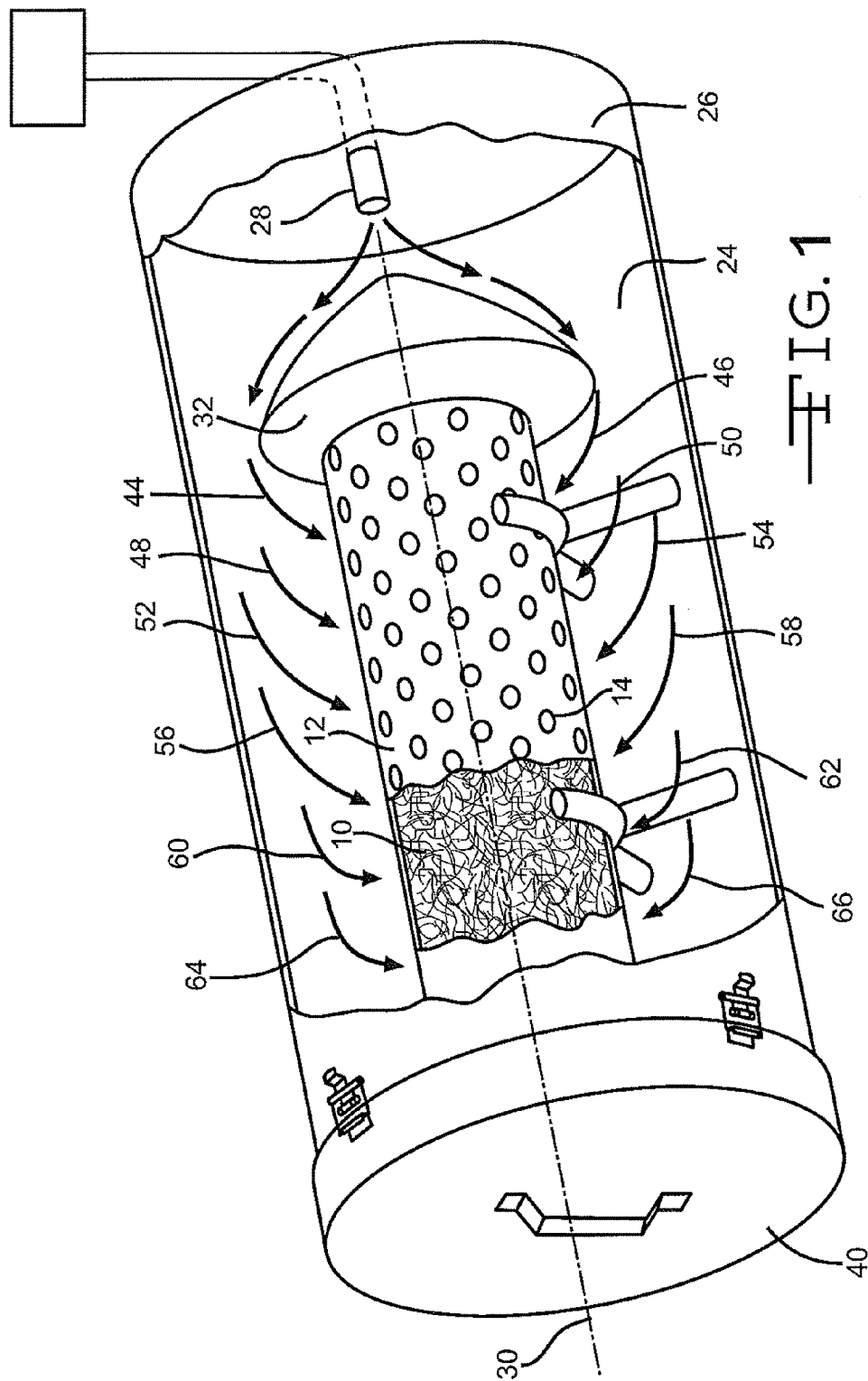
FIG. 1 is a perspective view of a first exemplary embodiment of the invention with portions cut-away to reveal internal structures.

Two different embodiments of the invention are shown in the Figures of the application. Similar features are shown in the two embodiments of the invention. Similar features have been numbered with a common reference numeral and have been differentiated by an alphabetic suffix. Similar features are structured similarly, operate similarly, and/or have the same function unless otherwise indicated by the drawings or this specification. Furthermore, particular features of one embodiment can replace corresponding features in the other embodiment or can supplement the other embodiment unless otherwise indicated by the drawings or this specification.

The embodiments of the invention disclosed below are applicable to the fabrication of an insert for a muffler. However, it is noted that the process steps set forth herein can be applied in other fields for porous preforms or other products used in other operating environments. A porous preform defined by a plurality of glass fibers and a heat-curing thermoset or thermoplastic materials applied to the plurality of glass fibers can be cured and used as a muffler insert. In the curing process, steam is caused to enter the preform from different directions and does not directly impinge on the preform. It is noted that the thickened arrows in the drawings schematically represent the flow of steam. Since the steam does not directly impinge on the preform, the preform is not deformed by the steam entering the chamber, but is quickly and uniformly cured without the excessive accumulation of condensation. The retained water is about 10% of the preform by weight.

The method disclosed herein is superior to previous methods. For example, it is faster, can provide for more uniform curing, and can be typically carried out at a lower temperature so there is no binder decomposition. The method also appears to be more energy efficient. Rapid curing cycle also allows the use of fewer molds.

For example, the average cure time for a batch (e.g. 40 preforms) of phenolic based thermoset binders can be less than one second. This compares with 30 seconds to 2 minutes for a forced hot air system or a simple convective hot air system. Typically, in hot air curing systems, the temperatures utilized are high enough that the binder will start to decompose. The reason for these high temperatures is to reduce the average curing time. In contrast, the temperatures used in this process are just above the maximum curing rate of the binder and below the temperature at which binder decomposition could begin. This results in a higher quality preform with minimal binder content. The curing of the preform with the new process is also more consistent since the steam rapidly penetrates the preform and releases most of its energy as the steam condenses. This compares with hot air systems where the outer part of preform attains higher temperatures than the inner parts of the preform because the porous preform is a good thermal insulator in an air environment. Because of the very efficient transfer of energy from the steam to the preform and the very thermally efficient steam generators readily available, the overall energy consumption of this process is typically less than that of prior art hot air systems. Because of the very rapid curing cycle, one will typically need fewer molds for the same process throughput than will be required for hot air processes.

Referring now to FIG. 1, in a first exemplary embodiment, a muffler preform 10 is retained in a perforated mold 12. The preform 10 is formed from a plurality of glass fibers and a heat-curing thermoset or thermoplastic materials applied to the plurality of glass fibers. At this point, a heat-curing thermoset material is uncured, and the glass fibers are moveable relative to one another prior to curing. The application of heat to the preform 10 causes the heat-curing thermoset material to cure and thereby tends to immobilize the glass fibers. Both the thermoset and thermoplastic materials can encase the fibers as well as bridge the fibers together. Since the binder materials tend to be less flexible than the glass fibers, simply encasing the fibers with the stiff binder materials will also tend to give structural integrity to the preform. The bridging mechanism will probably be dominant, at least in the case of thermoplastic materials. If a thermoplastic materials is used, the heat can allow the material to form bridges between fibers. When the binder material cools, the glass fibers will be bound together. The glass fibers can be injected into the mold 12 until the mold 12 is filled with the desired quantity of fibers. The fibers can be sprayed with the heat-curing thermoset or thermoplastic materials while being injected into the mold 12. Other means and methods can be used to insert the fibers into the mold 12 and to apply the binder either before or after the fibers enter the mold.

Figure 2:
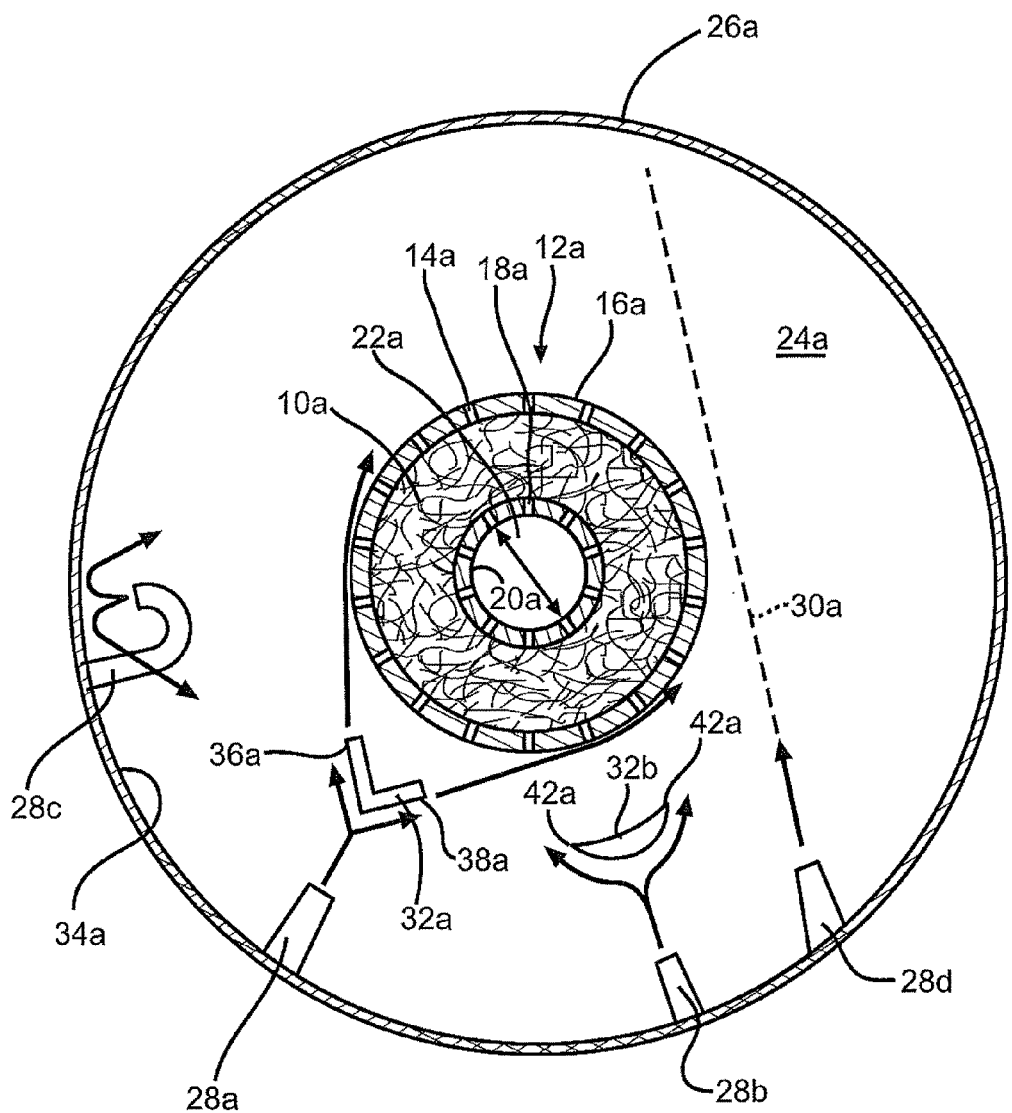
FIG. 2 is cross-section of a second exemplary embodiment of the invention.

As shown by FIG. 1, the mold 12 can be perforated, including apertures 14 on at least two different sides. The exemplary mold 12 includes a pattern of apertures 14 arranged around an entire periphery of the mold 12. In one embodiment, substantially 20% to substantially 50% of an outer surface of the mold 12 can be open to receive steam. It is possible to achieve acceptable curing with few holes in the mold. Generally, higher porosity of the mold tends to make the mold less mechanically durable in a manufacturing environment. However, a smaller porosity tends to increase the curing time. It is also noted that a preform without a central hole could be more in the shape of a rectangle than a cylinder, but could be cured by an embodiment of the process disclosed herein. FIG. 2 shows a second embodiment in which a mold 12a includes a first set of apertures 14a around an outer surface 16a and a second set of apertures 18a around an inner surface 20a. It is noted that the use of a mold for retaining the preform and the configurations of the molds 12, 12a are relevant to the exemplary embodiments and not limitations for every embodiment.

It is also noted that either mold 12 or 12a can be filled with a plurality of glass fibers and a heat-curing thermoset or thermoplastic materials assisted by a vacuum. For example, a vacuum can be applied in the interior cavity 22a shown in FIG. 2 as the preform materials are directed into the annular space between the surfaces 16a and 20a. Other applications of a vacuum can be applied in other mold configurations.

Referring again to FIG. 1, the chamber 24 can be defined by a pressure vessel 26. The mold 12 retaining the muffler preform 10 can be enclosed in a chamber 24 by placing the mold 12 in the chamber 24 and closing a door 40 of the pressure vessel 26. After the mold 12 is enclosed in the chamber 24 the chamber 24 can be filled with steam. The muffler preform is thus surrounded with steam. When the chamber 24 is closed after the mold 12 is inserted, the pressure in the chamber 24 can be a first pressure, such as atmosphere or some other level of pressure. The steam injected into the chamber 24 is at a second pressure that is higher than the first pressure. Steam is caused to enter the muffler preform 10 because the muffler preform 10 is porous and because of the differential between the first and second pressures. The steam can thus penetrate the muffler preform 10 and contact the heat-curing thermoset or thermoplastic materials throughout the muffler preform 10.

The steam will rapidly enter the interstices of the preform. When the steam contacts the glass filaments in the preform, it will change state from the gaseous phase to the liquid phase, giving up its latent heat of condensation to the glass fibers. The rapid movement of the steam deep into the preform is driven by the pressure difference between the air already present in the preform, at atmospheric pressure, and the pressure of the steam. The steam will travel rapidly and deeply into the preform (based upon the steam pressure) and will condense to the liquid form upon contact with the relatively colder binder-coated glass filaments.

The steam can be injected into the chamber 24 through an inlet port 28 after the enclosing step. Optionally, the steam can be directed by baffling surfaces inside the chamber 24 so as to not directly impinge the steam on the muffler preform 10. In other words, the inlet port 28 can direct the steam along an axis 30 but the steam contacts the preform 10 in a direction different from the axis 30. Since the steam does not directly impinge the preform, the steam will be less likely to deform the preform. It will also tend to heat the preform in a more uniform manner than if the steam directly impinges the preform from one or a plurality of inlets. FIG. 1 shows one example in which a baffle 32 is positioned along the axis 30 between the muffler preform 10 and the inlet port 28. The baffle 32 divides or bifurcates the flow of steam to opposite sides of the muffler preform 10.

In FIG. 1, the baffle 32 is shown diffusing the flow 360 degrees about the axis 30. By the arrangement shown in FIG. 1, the baffle 32 diverts the flow to the radial periphery of the chamber 24. In operation, the steam will penetrate the preform 10 from all sides of the preform 10 about the axis 30 for the full length of the preform along the axis 30. The steam represented by arrows 44 and 46 can penetrate the preform 10 initially, followed by the steam represented by arrows 48 and 50, followed by the steam represented by arrows 52 and 54, followed by the steam represented by arrows 56 and 58, followed by the steam represented by arrows 60 and 62, and followed by the steam represented by arrows 64 and 66. The arrows 44-66 are schematic and shown to illustrate the progression of steam from the inlet port 28, around the baffle 32, and along the axis 30. The diffusion of steam from the inlet port 28 along the axis 30 will occur substantially instantaneously. Thus, the embodiment in FIG. 1 provides a process for causing steam to rapidly penetrate the preform 10 from all sides and pass from the outside of the preform 10 to the inside.

FIG. 2 shows several other examples by which steam can be introduced to a chamber 24a without directly impinging on the muffler preform 10a. Inlet ports 28a, 28b are directed at baffles 32a, 32b, respectively, having various cross-sections. The baffle 32a is shaped such that outer baffling surfaces 36a and 38a extend tangent to the mold 12a. Thus, the flow of steam directed by surfaces 36a and 38a would not impinge directly on the preform 10a. The radially inner edge 42a of the baffle 32b is similarly shaped to be tangent to the mold 12a. It is also noted that a flat plate could be utilized placed between the inlet and the preform to diffuse the steam.

Another inlet port 28c can be directed at an inner surface 34a of the pressure vessel 26a. Thus, the pressure vessel 26a itself can define a baffling surface. An inlet port 28d can direct steam along an axis 30a that does not intersect the mold 12a or the preform 10a. The steam emitted from the inlet port 28d can emanate from the inlet port 28d such that the steam would contact the mold 12a prior to contacting the surface 34a. However, the steam emitted from the inlet port 28d would not directly impinge on the preform 10a since the axis 30a does not intersect the preform 10a.

The examples set forth in FIGS. 1 and 2 demonstrate that various embodiments can be practiced to cause steam to enter the muffler preforms 10, 10a from multiple directions, including opposite directions. Inlet ports can be arranged around the periphery of the preform or a single inlet port can direct steam into the chamber. In an embodiment having multiple inlet ports, the inlet ports can be equally spaced about a periphery of the preform or can be grouped together.

Referring again to FIG. 1, the muffler preform 10 can be enclosed in the chamber 24 when the muffler preform 10 is at a first temperature. The first temperature can be selected as desired and may be ambient temperature. The first temperature will be lower than the temperature of the steam to ensure that heat from the steam can be transferred to the heat-curing thermoset or thermoplastic materials. The chamber 24 can be at a first pressure when the door 40 of the pressure vessel 26 is closed. The first pressure can be selected as desired and may be ambient pressure or atmospheric pressure. The first pressure will be lower than the pressure of the steam to ensure that the steam will fully penetrate the preform 10.

The temperature and pressure of the steam can be selected to ensure curing, while minimizing the likelihood that condensation will remain after the chamber 24 is vented after curing. The temperature of the steam is normally controlled by the steam pressure. One could attach a subsequent heater to increase the temperature of the steam. That solution may be more costly than simply increasing the operating pressure of the steam generator. It is desirable to minimize the amount of condensation that remains on the preform after the curing process. The pressure of the steam can be at least eight times the first pressure in the exemplary embodiments, but could be less than eight times in other embodiments. For example, the steam can be injected into the chamber 24 at a pressure in the range of about 150 p.s.i. (10.2 atmospheres) to about 190 p.s.i. (12.9 atmospheres).

Generally, higher steam pressure corresponds to higher cost, so the pressure of the steam can be selected as the minimum pressure at which the steam will fully and quickly penetrate the preform 10 and the temperature of the steam is high enough that it will still cure the thermoset or allow the thermoplastic material to form bridges between fibers. The amount of condensation remaining on the preform can be further reduced by reducing the pressure in the chamber below atmospheric pressure for a brief time before the door is opened and pressure in the chamber raises/returns to atmospheric pressure. This would also further decrease the temperature of the preforms making them easier to handle when they are removed from the chamber.

Also, the minimum pressure of the steam can be selected in view of the corresponding temperature at which water will vaporize. The boiling point of water is dependent on the extent of the surrounding pressure. The steam imparts almost all of its useable heat to the thermoset or thermoplastic materials by condensing, changing state from vapor to liquid. Thus, the pressure of the steam can be selected so that the steam condensation will occur at a temperature that the thermoset or thermoplastic materials will rapidly cure. In one example, the steam can be injected into the chamber 24 at a temperature in the range from about 350° F. to about 380° F.

The steam may be injected into the chamber 34 as saturated steam, i.e. at the saturation temperature corresponding to the steam pressure.

The temperature can also be selected in view of the pressure and temperature conditions after the chamber 24 is vented and the door 40 is open. Specifically, it can be desirable that all of the condensate vaporizes when the curing process is complete. Therefore, the temperature of the steam can be selected so that the temperature of the condensate resulting from curing will be at a temperature high enough to vaporize at the pressure in the chamber 24 after venting. It is noted that the temperature of the muffler preform 10 will be raised by the steam, increasing the likelihood of complete vaporization of the condensate generated by curing.

An exemplary process according to an embodiment can proceed as follows. The mold 12 can be filled with a plurality of glass fibers and a heat-curing thermoset or thermoplastic materials applied to the plurality of glass fibers. The filled mold 12 can then be placed in the chamber 24 and the door 40 of the pressure vessel 26 can be closed to define the closed chamber 24. The temperature of the mold 12, preform 10, and the interior of the chamber 24 can be ambient. The pressure in the chamber 24 can be ambient. After the pressure vessel 26 is closed, steam can be injected into the chamber 24 for a period of about 20 seconds to about 120 seconds. The steam can be at a temperature in the range from about 350° F. to about 380° F. After a time within the range of about 120 seconds to about 150 seconds, the pressure in the chamber 24 can be in the range of about 120 p.s.i. to about 190 p.s.i. The time required to reach the maximum pressure is mainly dependent upon the capacity of the steam generator. In one commercial operation, a pressure of 150 psi would be reached within 20 seconds of the start of pressurization. As the chamber is being pressurized, the interior of the preform lags the temperature of the steam by about 15 seconds and less than 15° C. After reaching the maximum pressure, the time required to cure the binder or cause the binder to flow sufficiently that the preform will have mechanical integrity when cooled is in the range of about 30 seconds to about 150 seconds. Generally, the lower the steam temperature, the longer will be the time required for curing. Next, the chamber 24 can be vented and the door 40 to the pressure vessel 26 can be opened. It can be desirable to vent the chamber 24 and open the door 40 as quickly as possible so that the condensate does not experience a temperature drop, thus decreasing the likelihood of complete evaporation. In some embodiments, the chamber 24 can be vented and the door 40 opened in a time within the range of about 20 seconds to about 40 seconds. In another embodiment, the pressure in the chamber 24 can be reduced below atmospheric to decrease the amount of moisture remaining on the preform and further cool the preform. If there is condensate in the chamber, it can be removed before the door is opened.

The principle and mode of operation of the broader invention have been described in its preferred embodiments. However, it should be noted that this invention may be practiced otherwise than as specifically illustrated and described without departing from its scope.

What is claimed is:

1. A process for curing a porous muffler preform defined by a plurality of glass fibers and a heat-curing thermoset or thermoplastic material applied to the plurality of glass fibers, the process comprising:
retaining the muffler preform in a perforated mold;
enclosing the muffler preform and the perforated mold in a chamber having a baffle positioned therein;

introducing steam into the chamber at a temperature in the range of about 330° F. to about 390° F. and at a pressure in the range of about 90 p.s.i. to about 190 p.s.i.; and causing the steam to impact the baffle and change directions prior to entering the muffler preform through the perforated mold.

2. The process of claim 1 wherein the steam concurrently enters the muffler preform from opposite directions after impacting the baffle.

3. A process for curing a porous muffler preform defined by a plurality of glass fibers and a heat-curing thermoset or thermoplastic material applied to the plurality of glass fibers, the process comprising:

retaining the muffler preform in a mold;

enclosing the muffler preform and the mold in a chamber at a first pressure, said chamber including at least one baffling surface;

injecting steam into the chamber through an inlet port after the enclosing step, said steam injected into the chamber at a temperature in the range of about 330° F. to about 390° F. and at a pressure in the range of about 90 p.s.i. to about 190 p.s.i.; and wherein a direction of the steam is altered by the at least one baffling surface inside the chamber such that the steam does not directly impinge on the muffler preform.

4. The process of claim 3 wherein the at least one baffling surface causes the steam to enter the muffler preform concurrently from multiple directions.

5. The process of claim 3 wherein the at least one baffling surface bifurcates the flow of steam to opposite sides of the muffler preform.

6. The process of claim 3 wherein the steam is injected into the chamber at a second pressure at least eight times the first pressure.

7. The process of claim 3 wherein the mold is perforated and includes apertures on at least two different sides.

8. The process of claim 7 wherein the mold includes an outer surface exposed in the chamber and an inner surface surrounded by the outer surface and also exposed in the chamber, and wherein the injecting step includes causing steam to enter the mold through both the inner and outer surfaces.

9. The process of claim 8 in which substantially 5% to substantially 50% of the outer surface of the mold is open to receive steam.

10. The process of claim 3 further comprising:

causing the steam to enter the muffler preform from multiple directions;

raising the temperature of the muffler preform to substantially the temperature of the steam by contacting the muffler preform with the steam;

raising the pressure in the chamber through the introduction of the steam to the chamber;

condensing water on the muffler preform to impart heat to the heat-curing thermoset or thermoplastic material;

maintaining the temperature and pressure of the steam in the chamber for a time required to cure the thermoset or thermoplastic material or cause the thermoset or thermoplastic material to flow sufficiently that the preform will have mechanical integrity when cooled; and venting the chamber after the maintaining step.

11. The process of claim 10 wherein the venting step includes returning the pressure in the chamber to atmospheric in less than about 25 seconds.

12. A process for curing a porous muffler preform defined by a plurality of glass fibers and a heat-curing thermoset or thermoplastic material applied to the plurality of glass fibers, the process comprising:

retaining the muffler preform in a perforated mold;

enclosing the muffler preform and the perforated mold at a first temperature in a chamber at a first pressure, said chamber including at least one baffling surface;

introducing steam into the chamber at a second pressure greater than atmospheric and the first pressure and at a second temperature substantially at the boiling point of water at the second pressure; and causing the steam to impact the at least one baffling surface and change directions prior to entering the muffler preform through the perforated mold within the chamber, wherein water is condensed on the muffler preform and imparts heat to the heat-curing thermoset or thermoplastic material.

13. The process of claim 12 further comprising venting the chamber to atmosphere after the condensing step such that substantially all the condensate evaporates from the muffler preform.

14. The process of claim 13 wherein the venting step is further defined as venting the chamber in less than about 25 seconds.

15. The process of claim 12 further comprising reducing the pressure in the chamber below atmospheric after the steam is introduced into the chamber.

16. The process of claim 1 wherein the chamber is sized to accommodate a plurality of muffler preforms therein.

17. The process of claim 1 wherein the baffle is a flat disc.

18. The process of claim 3 wherein the chamber is sized to accommodate a plurality of muffler preforms therein.

19. The process of claim 3 wherein the at least one baffling surface includes a flat disc.

20. The process of claim 10 wherein the time is less than 30 seconds.

21. The process of claim 10 wherein the time is between about 30 seconds and about 150 seconds.

22. The process of claim 10 wherein the venting step includes returning the pressure in the chamber to atmospheric in a range of about 20 seconds to about 40 seconds.

23. The process of claim 12 wherein the chamber is sized to accommodate a plurality of muffler preforms therein.

24. The process of claim 12 wherein said second pressure is in the range of about 90 p.s.i. to about 190 p.s.i., and wherein said second temperature is in the range of about 330° F. to about 390° F.

25. The process of claim 13 wherein the venting step is further defined as venting the chamber in a range of about 20 seconds to about 40 seconds.

* * * * *